United States Patent
Funakawa

(10) Patent No.: US 6,795,196 B2
(45) Date of Patent: Sep. 21, 2004

(54) WAVELENGTH MEASUREMENT APPARATUS

(75) Inventor: Seiji Funakawa, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 204 days.

(21) Appl. No.: 10/077,673

(22) Filed: Feb. 15, 2002

(65) Prior Publication Data

US 2002/0130252 A1 Sep. 19, 2002

(30) Foreign Application Priority Data

Feb. 15, 2001 (JP) .................................... P. 2001-038841
Mar. 8, 2001 (JP) .................................... P. 2001-065360

(51) Int. Cl.[7] .............................................. G01B 9/02
(52) U.S. Cl. ....................................................... 356/450
(58) Field of Search ................................ 356/450, 480, 356/477

(56) References Cited

U.S. PATENT DOCUMENTS

| | | | | |
|---|---|---|---|---|
| 4,368,981 A | * | 1/1983 | Ozeki | .......................... 356/477 |
| 4,647,203 A | * | 3/1987 | Jones et al. | .................. 356/480 |
| 4,971,439 A | | 11/1990 | Brown | |
| 5,696,583 A | * | 12/1997 | Yoon | .......................... 356/497 |
| 5,784,159 A | | 7/1998 | Iwasaki | |
| 6,548,806 B1 | * | 4/2003 | Chung et al. | .......... 250/227.23 |
| 6,587,484 B1 | * | 7/2003 | May | .............................. 372/20 |

OTHER PUBLICATIONS

Patent Abstracts of Japan, vol. 17, No. 481 (P–1604) Aug. 31, 1993, Abstract of JP 05 118922.

* cited by examiner

Primary Examiner—Frank G. Font
Assistant Examiner—Andrew H. Lee
(74) Attorney, Agent, or Firm—Fish & Richardson P.C.

(57) ABSTRACT

Light under measurement whose wavelength is continuously swept is incident on fiber-optic Etalon. The fiber-optic Etalon transmits the light under measurement each time the wavelength of the light under measurement satisfies specific conditions. A PD detects the transmitted light of the fiber-optic Etalon and outputs the intensity of the light under measurement. A counter counts the number of peaks of the output of the PD. A CPU calculates the wavelength of the light under measurement based on the count value of the counter.

21 Claims, 10 Drawing Sheets

| SET WAVELENGTH | UP/DOWN COUNTER VALUE | COUNTER VALUE | WAVELENGTH AFTER CORRECTION |
|---|---|---|---|
| 1500.000 | 0000000 | 0000000 | 1500.000 |
| 1500.010 | 0000010 | 0000012 | 1500.012 |
| 1500.020 | 0000020 | 0000022 | 1500.022 |
| 1500.030 | 0000030 | 0000029 | 1500.029 |
| ⋮ | ⋮ | ⋮ | ⋮ |
| 1501.000 | 0001000 | 0001005 | 1501.005 |

FIG. 6

| COMPARISON VALUE | UP/DOWN COUNTER VALUE | WAVELENGTH FROM UP/DOWN COUNTER | ACTUAL WAVELENGTH |
|---|---|---|---|
| 9999990. | 9999985. | 1499.985 | 1499.990 |
| 0000000. | 0000002. | 1500.002 | 1500.000 |
| 0000010. | 0000008 | 1500.008 | 1500.010 |
| 0000020. | 0000019 | 1500.019 | 1500.020 |
| 0000030. | 0000032 | 1500.082 | 1500.030 |
| ⋮ | ⋮ | ⋮ | ⋮ |
| 0001000. | 0001008 | 1501.008 | 1501.000 |

WAVELENGTH MEASUREMENT APPARATUS

BACKGROUND OF THE INVENTION

1. Field of the Invention

The present invention relates to a wavelength measuring apparatus for measuring wavelength of light under measurement and in particular to wavelength measurement apparatus for measuring wavelength of sweep light that varies continuously.

2. Description of the Related Art

Conventionally, an interferometer is used to measure the wavelength of light under measurement. FIG. 11 shows a Michelson interferometer. The Michelson interferometer 1100 comprises a reference light source 101 for emitting reference light having a known wavelength λ0, a fixed mirror 1102, a movable mirror 1103 provided slidably in parallel with the optical path, a half mirror 1104 provided at an angle of 1045 degrees from the optical path, a photo-detector for light under measurement 1105, and a photo-detector for reference light 1106.

In the Michelson interferometer 1100, light under measurement having an unknown wavelength λ is emitted toward Point B of the half mirror 1104. Part of the outgoing light under measurement is reflected at the right angle at Point B of the half mirror 1104, reversed by 180 degrees in direction by the fixed mirror 1102, passes through Point A of the half mirror 1104, and incident on the photo-detector for light under measurement 1105. Other part of the light under measurement passes through Point B of the half mirror 1104, reversed by 180 degrees in direction by the movable mirror 1103, reflected at the right angle at Point A of the half mirror 1104, and incident on the photo-detector for light under measurement 1105.

Meanwhile, part of reference light emitted from the reference light source 1101 is reflected at the right angle at Point A of the half mirror 1104, reversed by 180 degrees in direction by the fixed mirror 1102, passes through Point B of the half mirror 1104, and incident on the photo-detector for reference light 1106. Other part of the light under measurement passes through Point A of the half mirror 1104, reversed by 180 degrees in direction by the movable mirror 1103, reflected at the right angle at Point B of the half mirror 1104, and incident on the photo-detector for reference light 1106.

In this way, on each photo-detector 1105, 1106 are incident light that passed through the fixed mirror 1102 and light that passed through the movable mirror 1103 thus generating interference between these light beams. Thus, in case the movable mirror 1103 is slide in the direction of the arrow in the figure, output signals output from the photo-detectors include cyclic peaks caused by interference as shown in FIG. 12.

The pitch length P of the photo-detector for light under measurement 1105 corresponds to the wavelength λ of the light under measurement. In case the movable mirror 1103 is moved for a predetermined distance D, the wavelength λ of the light under measurement is determined from the number of peaks n0 of the output signal from the photo-detector for light under measurement 1105, the number of peaks n1 of the output signal from the photo-detector for reference light 1106, and the wavelength λ0 of the reference light, and represented by the following expression:

$$\lambda = (n0/n1) \times \lambda 0 \tag{1}$$

However, in a related art interferometer such as a Michelson interferometer, it is assumed that the wavelength of the light under measurement is fixed during measurement. Thus it was impossible to accurately measure the wavelength in case the wavelength of the light under measurement continuously varied. That is, the number of peaks n1 does not reflect local variation of the wavelength of the light under measurement so that the average value of varied wavelengths is measured in case the wavelength of the light under measurement varies while the movable mirror 1103 is slid.

SUMMARY OF THE INVENTION

An object of the invention is to provide wavelength measurement apparatus that can measure the wavelength of the light under measurement under sweep process with high accuracy and in real time even in case the wavelength is continuously swept.

In order to attain such an object, according to a first aspect of the invention, there is provided a wavelength measurement apparatus comprising:

an optical filter (such as a fiber-optic Etalon 3 in FIG. 1) to which a light beam is incident;

a photo-detector (for example a photodiode 4 in FIG. 1) for detecting the transmitted light of the optical filter, the photo-detector for outputting intensity of the transmitted light;

a counter (for example a counter 8 in FIG. 1) for counting the number of peaks of the output of the photo-detector to generate a count value; and a controller (for example a CPU 14 in FIG. 1) for calculating the wavelength of the light beam based on the count value of the counter.

Here, the optical filter may be any optical filter that selectively transmits light having a predetermined length and may be composed of an interference optical filter where a multi-layered optical film is evaporated on Fabry-Perot Etalon, silica based glass, or silicon.

In the first aspect of the invention, the light under measurement is incident on the optical filter. The optical filter selectively transmits light having a predetermined waveform. The photo-detector detects the transmitted light that passed through the optical filter and outputs the light intensity of the transmitted light. In case the wavelength of the light under measurement is continuously swept, the measured is transmitted through the optical filter each time the wavelength of the light under measurement satisfies predetermined conditions that conform to the physical characteristics of the optical filter.

The predetermined wavelength interval (finesse) is a length determined according to the physical characteristics of the optical filter so that it is possible to know the correct value in advance based on a theoretical formulae such as the Airy's formulae or a measured value. Thus, the count value (number of peaks) currently counted by the counter represents a relative variation of the wavelength from the start of sweep to this point in time. The controller calculates the wavelength of the light under measurement based on the count value so that it can calculate the instantaneous wavelength value at this point in time. As a result, it is possible to measure the wavelength of the light under measurement under sweep process with high accuracy and in real time even in case the wavelength is continuously swept.

According to a second aspect of the invention, there is provided a wavelength measurement apparatus according to the first aspect of the invention, the controller resets the count value when light having a known reference wavelength is incident.

In the second aspect of the invention, an operator resets the count value via the controller when light having a known reference wavelength is incident. Accordingly, the count value of the counter while the wavelength of the light under measurement is being swept represents a relative variation from the reference wavelength. Thus, the controller can accurately calculate the wavelength of light under measurement under sweep. It is thus possible to measure the wavelength of the light under measurement under sweep process with high accuracy and in real time even in case the wavelength is continuously swept.

According to a third aspect of the invention, the wavelength measurement apparatus further comprises:

a synchronization signal output unit (for example a comparison register 13 in FIG. 1) for outputting a synchronization signal with a predetermined timing, wherein the controller acquires the count value each time the synchronization signal from the synchronization signal output unit is detected.

In the third aspect of the invention, the synchronization signal output unit outputs a synchronization signal with a predetermine timing. The controller acquires the count value each time the synchronization signal from the synchronization signal output unit is detected. The controller calculates the wavelength per count value acquired by the controller. Thus, it is possible to calculate in real time the wavelength of the light under measurement per predetermined timing in the process of sweeping the light under measurement. It is also possible to calculate, correct and display the wavelength based on the count values after capturing the count values.

The synchronization signal output unit preferably outputs the synchronization signal based on the count value of the counter, as in a fourth aspect of the invention.

As in a fifth aspect of the invention, the light under measurement is emitted from a tunable light source (for example a TLS 1 in FIG. 1) comprising a light source and a wavelength adjusting mechanism (for example a motor/encoder 2 in FIG. 1) for varying the wavelength of the light source. The synchronization signal output unit preferably outputs the synchronization signal based on the operation amount of the wavelength adjusting mechanism.

According to a sixth aspect of the invention, the counter counts the number of peaks of the output by incrementing or decrementing the count value each time the output of the photo-detector exceeds/drops below a predetermined reference value.

According to the sixth aspect of the invention, the counter counts the number of peaks of the output by incrementing or decrementing the count value each time the output of the photo-detector exceeds/drops below a predetermined reference value. Thus it is made easy to accurately calculate the number of peaks of the output of the photo-detector.

According to a seventh aspect of the invention, the reference value varies according to the light intensity of the reference light branched from the light under measurement before the optical filter.

According to the seventh aspect of the invention, the reference value varies according to the light intensity of the reference light branched from the light under measurement before the optical filter. Thus, even in case a fluctuation is present in the intensity of the light under measurement, it is possible to avoid an error in the count value caused by the fluctuation. That is, the fluctuation exerts an influence on both the output of the photo-detector and the reference value so that it is possible to cancel the fluctuation in case these values are compared with each other.

According to an eighth aspect of the invention, wherein the controller corrects the wavelength value of the light beam calculated by the controller based on at least one of the sweep start wavelength value and the sweep end wavelength value of the light beam.

The sweep start wavelength value and the sweep end wavelength value are preferably measured to a maximum accuracy through measurement using for example a wavemeter with sufficient accuracy guaranteed.

According to the eighth aspect of the invention, the controller corrects the wavelength value of the light under measurement calculated by the controller based on at least one of the sweep start wavelength value and the sweep end wavelength value of the light under measurement. In case an error is present in the calculation results of the controller, the error can be reduced. It is obvious that the wavelength value of the light under measurement can be corrected based on both the sweep start wavelength value and the sweep end wavelength value. In such a case, the accuracy of wavelength halt of the light under measurement (±ΔWL) at the start and end of sweep can be set to zero thus the error in the peak interval can be set to zero. This obtains a more accurate wavelength value.

According to a ninth aspect of the invention, the optical filter is a fiber-optic Etalon (for example fiber-optic Etalon 3 in FIG. 1) composed of an optical fiber and high-reflection members (for example high-reflection films 3a, 3a) supplied on both ends of the optical fiber.

In the ninth aspect of the invention, when light under measurement is incident on the fiber-optic Etalon, the light under measurement repeats reflection between high-reflection member at one end and the high-reflection member at the other end in the fiber-optic Etalon. When the wavelength of the incident light under measurement satisfies specific conditions, the light under measurement is transmitted through the fiber-optic Etalon. In case the wavelength of the incident light under measurement is continuously swept, the light intensity of the transmitted light output by the photo-detector reaches a peak per predetermined wavelength interval. Here, the predetermined wavelength interval (Δλ) is a length determined by the physical characteristics of the fiber-optic Etalon. Assuming that the length of the fiber-optic Etalon as L, refraction index as n, and the wavelength of the light under measurement as λ, Δλ is represented by the following expression (2):

$$\Delta\lambda = \lambda^2/(2\,nL) \tag{2}$$

As shown in the expression (2), the wavelength interval (Δλ) is inversely proportional to the length L of the fiber-optic Etalon. The shorter the wavelength interval (Δλ), the better the resolution of wavelength variation during sweep. For the fiber-optic Etalon, it is possible to provide the sufficient length L so that it is easy to measure the wavelength of continuously swept light under measurement with accuracies of for example 1 pm to 0.1 pm or better.

According to a tenth aspect of the invention, wherein the wavelength measurement apparatus further comprises a heat insulator for keeping the temperature of the fiber-optic Etalon to be constant.

According to the tenth aspect of the invention, the heat insulator keeps constant the temperature of the fiber-optic Etalon so that it is possible to prevent expansion/contraction of the length L of the fiber-optic Etalon caused by variation in the ambient temperature. This assures more accurate measurement of the wavelength of light under measurement.

According to an eleventh aspect of the invention, there is provided a wavelength measurement apparatus comprising:

a first optical filter (for example a gas cell in FIG. 7) to which one of light beams branched is incident and through which the one of light beams is transmitted, the first optical filter for discriminating the one of the light beam with at least two of pre-calibrated wavelength components;

a second optical filter (for example a fiber-optic Etalon in FIG. 7) to which the other of the branched light beam is incident and the incident light beam is transmitted in a free spectral range shorter than the interval between the two of the pre-calibrated wavelength components; and a controller (for example a CPU 119 in FIG. 7) for calculating the wavelength of the light beam based on the transmitted light of the first optical filter and the transmitted light of the second optical filter.

In the eleventh aspect of the invention, the light under measurement is incident while branched to the first optical filter and the second optical filter. The first optical filter discriminates between at least two types of pre-calibrated wavelength components. It is thus possible to set reference values on at least two points based on the intensity of the transmitted light of the first optical filter. The second optical filter has a free spectral range shorter than the interval between these at least two types of pre-calibrated wavelengths. In case the wavelength of the light under measurement is swept continuously, a plurality of peaks are present in the intensity of the transmitted light of the second optical filter between the two types of wavelengths. It is thus possible to accurately correct the wavelength interval in the free spectral range of the second optical filter based on the number of peaks and the interval between the reference values on two points. Thus, the controller can accurately calculate the relative variation of the wavelength from start of sweep to the present point in time, so that it is possible to measure the wavelength of the light under measurement under sweep process with high accuracy even in case the wavelength is continuously swept.

According to a twelfth aspect of the invention, wherein the controller corrects the free spectral area of the second optical filter by dividing the wavelength scale in the variation between the two types of wavelengths by the number of peaks of the transmitted output of the second optical filter.

According to the twelfth aspect of the invention, correction between two types of wavelengths assures accurate correction in the wavelength interval of the second optical filter also in wavelengths outside the two types of wavelengths.

According to a thirteenth aspect of the invention, the first optical filter is a gas cell (for example a gas cell in FIG. 7) for absorbing at least two types of pre-calibrated wavelength components.

According to the thirteenth aspect of the invention, the gas cell absorbs at least two types of pre-calibrated wavelength components. Thus it is possible to set a reference value with a timing when the intensity of the transmitted light of the gas cell is significantly weak. The gas cell has an excellently stable wavelength discrimination characteristic against disturbance such as temperatures thus assuring more accurate measurement of light under measurement.

According to a fourteenth aspect of the invention, the first optical filter is an Etalon (for example Fabry-Perot Etalon in FIG. 10) that assumes the interval between at least two types of pre-calibrated wavelengths as a free spectral range.

According to the fourteenth aspect of the invention, cyclic peaks are generated in the intensity of the transmitted output of Etalon while light under measurement is being swept. Thus it is possible to set a reference value with a timing the peak is generated.

According to a fifteenth aspect of the invention, the wavelength measurement apparatus further comprises:

a counter (for example a counter 114 in FIG. 7) for counting the number of peaks of transmitted output of the second optical filter; and wherein the controller resets the count value of the counter when light having a known reference wavelength is incident.

In the fifteenth aspect of the invention, an operator resets the count value via the controller when light having a known reference wavelength is incident. Accordingly, the count value of the counter while the wavelength of the light under measurement is being swept represents a relative variation from the reference wavelength. Thus, the controller can accurately calculate the wavelength of light under measurement under sweep. It is thus possible to measure the wavelength of the light under measurement under sweep process with high accuracy and in real time even in case the wavelength is continuously swept.

According to a sixteenth aspect of the invention, the wavelength measurement apparatus further comprises a synchronization signal output unit (for example a comparison register 17 in FIG. 7) for outputting a synchronization signal with a predetermined timing, Wherein the controller acquires the count value each time the synchronization signal from the synchronization signal output unit is detected.

Here, the synchronization signal output unit preferably outputs a synchronization signal based on the count value of the counter according to the fifth aspect of the invention, as in a seventeenth aspect of the invention.

According to an eighteenth aspect of the invention, the light under measurement is emitted from a tunable light source (for example a TLS 1 in FIG. 7) comprising a light source and a wavelength adjusting mechanism (for example a motor/encoder 102 in FIG. 7) for varying the wavelength of the light source, the synchronization signal output unit preferably outputs a synchronization signal based on the operation amount of the wavelength adjusting mechanism.

In the eighteenth aspect of the invention, the synchronization signal output unit outputs a synchronization signal with a predetermine timing. The controller acquires the count value each time the synchronization signal is detected. The controller calculates the wavelength per count value acquired by the controller. Thus, it is possible to calculate the wavelength of the light under measurement per predetermined timing in the process of sweeping the light under measurement. It is also possible to calculate, correct and output the wavelength based on the count values after capturing the count values.

According to a nineteenth aspect of the invention, the counter counts the number of peaks of the transmitted output by incrementing or decrementing the count value each time the transmitted output of the second optical filter exceeds/drops below a predetermined reference value.

According to the nineteenth aspect of the invention, the counter counts the number of peaks of the transmitted output by incrementing or decrementing the count value each time the transmitted output of the second optical filter exceeds/drops below a predetermined reference value. Thus it is made easy to accurately calculate the number of peaks of the output of the photo-detector.

According to a twentieth aspect of the invention, the reference value varies according to the light intensity of the reference light branched from the light under measurement before the second optical filter.

According to the twentieth aspect of the invention, the reference value varies according to the light intensity of the reference light branched from the light under measurement before the optical filter. Thus, even in case a fluctuation is present in the intensity of the light under measurement, it is possible to avoid an error in the count value caused by the fluctuation. That is, the fluctuation exerts an influence on both the transmitted output of the second optical filter and the reference value so that it is possible to cancel the fluctuation in case these values are compared with each other.

According to a twenty-first aspect of the invention, the controller corrects the wavelength value of the light under measurement calculated based on at least one of the sweep start wavelength value and the sweep end wavelength value of the light under measurement.

The sweep start wavelength value and the sweep end wavelength value are preferably measured to a maximum accuracy through measurement using for example a wavemeter with sufficient accuracy guaranteed.

According to the twenty-first aspect of the invention, the controller corrects the wavelength value of the light under measurement calculated by the controller based on at least one of the sweep start wavelength value and the sweep end wavelength value of the light under measurement thus an error can be reduced. It is obvious that the wavelength value of the light under measurement can be corrected based on both the sweep start wavelength value and the sweep end wavelength value. In such a case, the accuracy of wavelength halt of the light under measurement (±ΔWL) at the start and end of sweep can be set to zero thus the error in the peak interval can be set to zero. This obtains a more accurate wavelength value.

According to a twenty-second aspect of the invention, the second optical filter is a fiber-optic Etalon (for example fiber-optic Etalon 108 in FIG. 7) comprising an optical fiber and high-reflection films (for example high-reflection films 8a, 8a) supplied on both ends of the optical fiber.

In the twenty-second aspect of the invention, when light under measurement is incident on the fiber-optic Etalon, the light under measurement repeats reflection between the high-reflection member at one end and the high-reflection member at the other end in the fiber-optic Etalon. When the wavelength of the incident light under measurement satisfies specific conditions, the light under measurement is transmitted through the fiber-optic Etalon. In case the wavelength of the incident light under measurement is continuously swept, the light intensity of the transmitted light output by the photo-detector reaches a peak per predetermined wavelength interval. Here, the predetermined wavelength interval (Δλ) is a length determined by the physical characteristics of the fiber-optic Etalon. Assuming that the length of the fiber-optic Etalon as L, refraction index as n, and the wavelength of the light under measurement as λ, Δλ is represented by the following expression (2):

$$\Delta\lambda = \lambda^2/(2nL) \qquad (2)$$

As shown in the expression (2), the wavelength interval (Δλ) is inversely proportional to the length L of the fiber-optic Etalon. The shorter the wavelength interval (Δλ), the better the resolution of wavelength variation during sweep. For the fiber-optic Etalon, it is possible to provide the sufficient length L so that it is easy to measure the wavelength of continuously swept light under measurement with accuracies of for example 1 pm or better.

According to a twenty-third aspect of the invention, the wavelength measurement apparatus further comprises a heat insulator for keeping constant the temperature of the fiber-optic Etalon.

According to the twenty-third aspect of the invention, the heat insulator keeps constant the temperature of the fiber-optic Etalon so that it is possible to prevent a change in the length L and the refraction index n. This assures more accurate measurement of the wavelength of light under measurement.

BRIEF DESCRIPTION OF THE DRAWINGS

FIG. 6 is a schematic table in time series by synchronization signal of the comparison value of the comparison register 13 (value of the counter 8), count value of the up/down counter 12, wavelength value calculated based on the count value of the up/down counter 12, and the actual wavelength of the light under measurement in the wavelength measurement apparatus 30.

DETAILED DESCRIPTION OF THE PRESENT INVENTION

The present invention will be described with reference to the accompanying drawings.

First Embodiment

Figure 1:
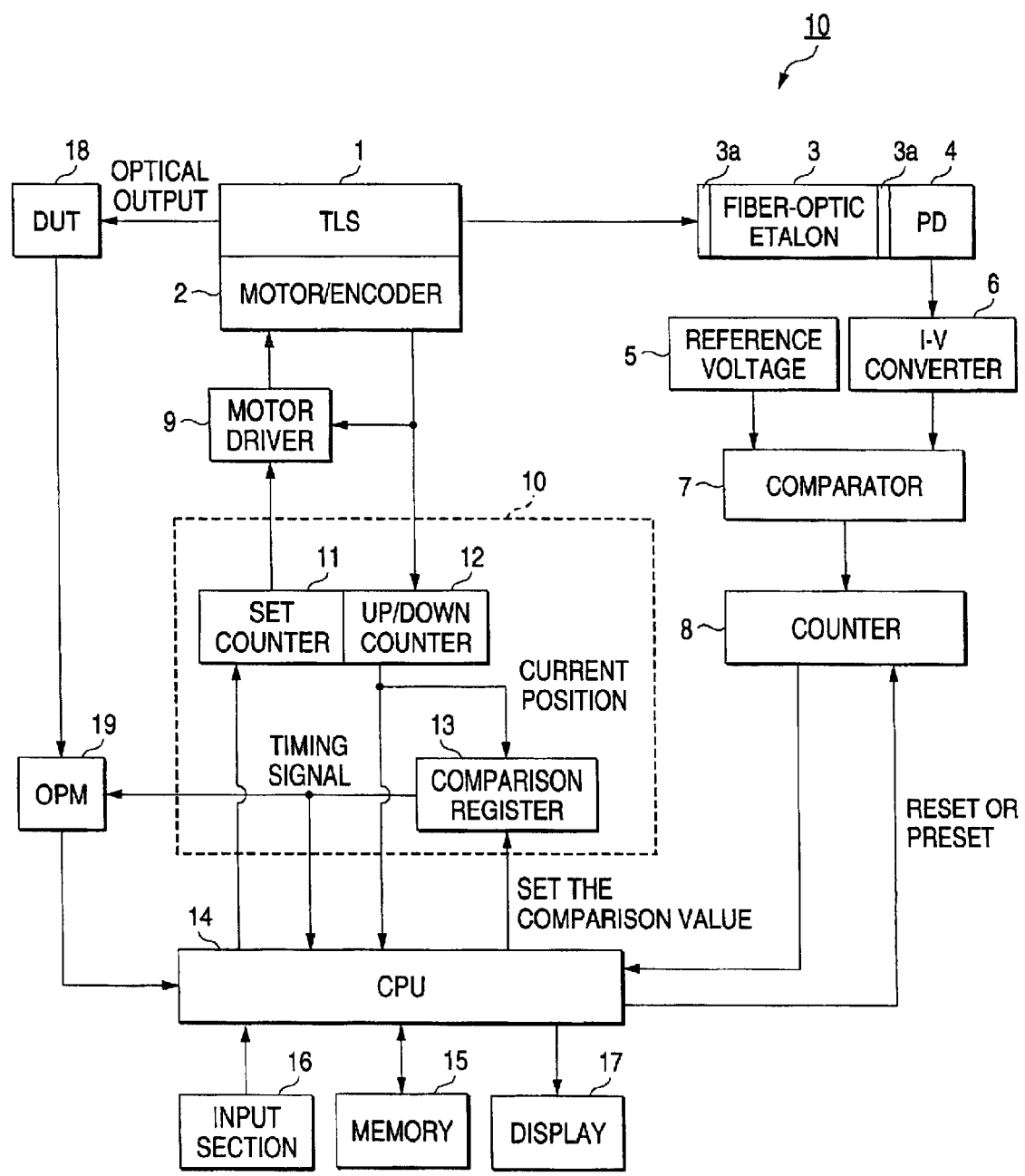
FIG. 1 is a block diagram showing the configuration of wavelength measurement apparatus 10 according to the first embodiment.

FIG. 1 is a block diagram showing wavelength measurement apparatus according to the first embodiment. The wavelength measurement apparatus 10 comprises a tunable light source (TLS) 1, a motor/encoder 2, fiber-optic Etalon 3, a photodiode (PD) 4, a reference voltage source 5, a current-to-voltage converter (I-V converter) 6, a comparator (COMPARATOR) 7, a counter (COUNTER) 8, a motor driver 9, a motor controller 10, a set counter (SETCOUNTER) 11, an up/down counter (UP/DOWN COUNTER) 12, a comparison register 13, a CPU 14, a memory 15, an input section 16, a display (DISPLAY) 17, and an OPM 19. A DUT (Device Under Test) 18 is shown as a target of measurement.

The tunable light source has a semiconductor laser (LD: Laser Diode) with a non-reflective film supplied on one end, and a tunable structure composed of a diffraction grating and mirrors for adjusting the oscillation of the semiconductor laser. The tunable light source 1 is calibrated in advance so that the oscillation wavelength may coincide with a reference wavelength (for example 1500.000 nm) in case the reference wavelength (1500.000 nm) is set at the input section 16.

The motor/encoder 2 comprises an encoder 2a and a motor 2b. The encoder 2a generates a signal that corresponds to the travel amount when the position of the motor 2b has changed and outputs the signal to the motor controller 10, which controls the position of the motor. That is, the motor controller varies or sweeps the oscillation wavelength of the semiconductor laser by changing the position of the diffraction grating or mirrors attached to the motor 2b in the tunable structure of the tunable light source 1.

The fiber-optic Etalon 3 comprises an optical fiber and a pair of high-reflection films (AR coating) 3a, 3b provided perpendicular to the propagation direction of the optical fiber on both ends of the optical fiber. The fiber-optic Etalon 3 selectively transmits only the light under measurement having a specific wavelength determined by the physical characteristics of the fiber-optic Etalon 3.

The photodiode 4 detects transmitted light of the fiber-optic Etalon 3 and outputs a current according to the intensity (power) of the transmitted light. The reference voltage source 5 applies a specific voltage (hereinafter referred to as the "counter threshold voltage") to the comparator 7. The current-to-voltage converter 6 converts a current output from the photodiode 4 to a voltage (hereinafter referred to as the "output voltage") corresponding to the magnitude of the current, and applies the resulting voltage to the comparator 7.

Figures 2, 3:
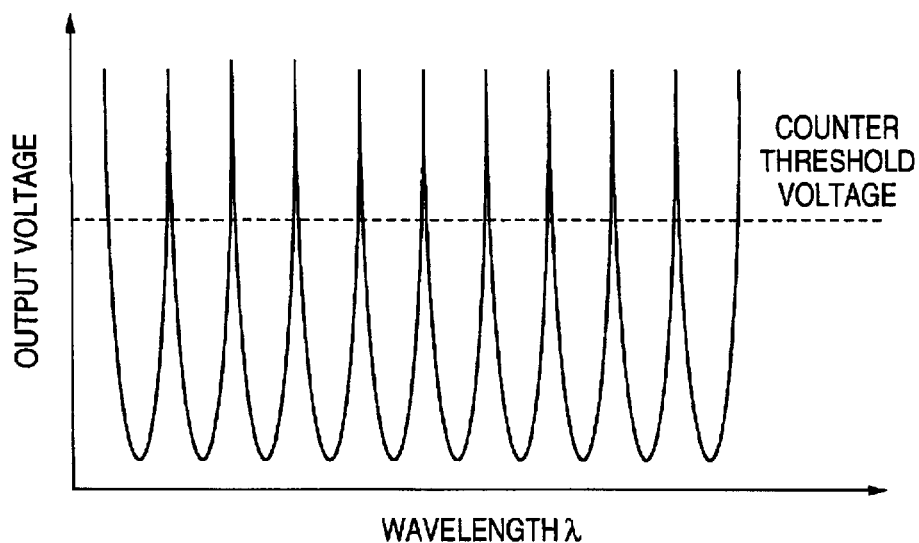
FIG. 2 shows the transmission characteristics of fiber-optic Etalon.
FIG. 3 is a schematic table in time series by synchronization signal of the set wavelength in the tunable light source 1, count value of the up/down counter 12, count value of the counter 8, and the wavelength calculated by the CPU 14 in the wavelength measurement apparatus 10.

The comparator 7 compares the output voltage applied by the current-to-voltage converter 6 with the counter threshold voltage applied by the reference voltage source and outputs the comparison results to the counter 8. Here, action of the comparator 7 is specifically described referring to the monitor example of the output voltage in FIG. 2. In FIG. 2, the horizontal axis represents the wavelength of the light under measurement and the vertical axis a voltage. The broken line represents a counter threshold voltage.

The fiber-optic Etalon 3 selectively transmits only the light under measurement having a specific wavelength. In case the wavelength of the light under measurement incident on the fiber-optic Etalon 3 is continuously swept, a cyclic peak waveform appears on the output voltage as shown in FIG. 2. The wavelength representing the interval between adjacent peak waveforms (hereinafter referred to as the "peak interval wavelength") differs depending on the physical characteristics of the fiber-optic Etalon 3. It is assumed that the peak interval wavelength of the fiber-optic Etalon 3 is calibrated in units of 1 pm.

The comparator 7 compares the output voltage with the counter threshold voltage and outputs a first state signal as comparison results to the counter in case the output voltage is above the counter threshold voltage value. The comparator 7 outputs a second state signal as comparison results to the counter in case the output voltage is below the counter threshold voltage value.

The counter 8 increments or decrements the count value each time the comparison results from the comparator 7 make transition from the first state signal to the second state signal, or from the second state signal to the first signal, that is, each time the output voltage exceeds/drops below the counter threshold voltage value. In this way, the number of peaks of the output voltage is counted.

The motor driver 9 references the number of pulses as the final destination set to the set counter and applies a power corresponding to the number of pulses to the motor 2b to make direct drive control of the motor 2b. The motor controller 10 comprises the set counter 11, the up/down counter 12, and the comparison register 13.

The set counter 11 stores the number of pulses as operation amount of the motor 2b set by the CPU 14 in advance. The up/down counter 12 increments the count value each time the motor 2b is driven by one step in accordance with the response signal from the motor/encoder 2 in the process of sweeping the light under measurement as well as outputs the count value to the controller 14 and the comparison register 13. The count value of the up/down counter represents the current position of the motor 2b.

The comparison register 13 stores the comparison value updated as required by the controller 14 as well as compares the comparison value with the count value of the up/down counter 12. In case these values match with each other, the comparison register 13 outputs a synchronization signal (TIMINGSIGNAL) to the CPU 14 and the OPM 17.

The CPU 14 performs centralized control of the components and calculates in real time the wavelength of the light under measurement based on the current count value of the counter 8 and the reference wavelength value (for example 1500.000 [nm]) stored in the memory 15. The memory 15 comprises an EEPROM (Electrically Erasable, Programmable Read Only Memory) and flash ROM and stores the first table that specifies the relationship between the number of pulses and wavelength of the motor 2b and the reference wavelength.

The input section 16 is equipped with various keys for the operator to input a desired reference wavelength. The display 17 displays in real time the wavelength of the light under measurement calculated by the CPU 14. The DUT 18 is a target of measurement by an optical module, optical splitter and optical circulator. On the DUT 18 are incident laser beams from the tunable light source 1. The OPM 19 detects the transmitted light of the DUT 18 and outputs the intensity of the detected transmitted light to the CPU 14.

Operation of the wavelength measurement apparatus 10 in FIG. 1 will be described below. The operator sets the reference wavelength (for example 1500.000 [nm]) in advance at the input section 16. Then the reference light calibrated so as to precisely coincide with the reference wavelength is emitted to the fiber-optic Etalon 3 from the tunable light source 1. The CPU 14, detecting that the reference light has been incident on the fiber-optic Etalon 3, resets (or presets) the count values of the counter 8 and the up/down counter 12 and sets each count value to zero.

Next, the CPU 14, detecting that the reference wavelength is input, stores the input reference wavelength (1500.000 [nm]) into the memory 15.

Then, the operator enters the final wavelength obtained at completion of the sweep process at the input section 16. Detecting the input of the final wavelength, the CPU 14 references the memory 15 to recognize the number of pulses as the final destination of the motor 2b corresponding to the final wavelength, and sets the number of pulses recognized as the final destination to the set counter 11. When the number of pulses is set to the set counter 11, The motor driver 9 starts driving the motor/encoder 2 thus starting the wavelength sweep of the light under measurement. In the process, the encoder 2a outputs a response signal to the motor driver 9 and the up/down counter 12 each time the motor 2b is driven by one step.

The up/down counter 12 increments the count value each time it detects a response signal from the motor/encoder 2, and outputs the incremented count value to the comparison register 13 and the CPU 14. The comparison register 13 outputs a synchronization signal to the CPU 14 and the OPM 19 each time the comparison value stored in the comparison register 13 coincides with the count value of the up/down counter 13.

The CPU 14 reads the count value of the counter 8 each time it detects a synchronization signal. The CPU 14 then calculates the sum of the relative variation of the wavelength obtained by multiplying the read count value by the peak interval wavelength (for example 1 [pm]) and the reference wavelength (1500.00 [nm]) stored in the memory 15 in advance. The OPM 19 captures the optical output from the DUT 18 and transfers the optical output captured to the CPU 14.

Then, the CPU 14 instructs the display to monitor in real time the wavelength of the light under measurement calculated and the optical output from the OPM 19 as well as updates the comparison value of the comparison register 13 to next value. In this way, the local wavelength at that point in time is monitored each time a synchronization signal is issued. FIG. 3 is a schematic representation in time series by synchronization signal of the set wavelength in the tunable light source 1, count value of the up/down counter 12, count value of the counter 8, and the wavelength calculated by the CPU 14. FIG. 3 assumes that the comparison value of the comparison register is updated in intervals of 10 seconds, such as 10, 20, 30, . . . by the CPU 14.

According to the wavelength measurement apparatus 10 of the embodiment, the following advantages are obtained:

(1) The count value (number of peaks) currently counted by the counter 8 represents a relative variation in the wavelength from the start of sweep to this point in time. The CPU 14 calculates in real time the wavelength of the light under measurement based on the count value by using the synchronization signal as a trigger, so that the CPU 14 can monitor the instantaneous wavelength value of the light under measurement at this point in time. As a result, it is possible to measure the wavelength of the light under measurement under sweep process with high accuracy and in real time even in case the wavelength is continuously swept.

(2) The shorter the wavelength interval, the better the resolution of wavelength variation during sweep. For the fiber-optic Etalon 3, it is possible to provide the sufficient length so that it is easy to measure the wavelength of continuously swept light under measurement with accuracies of for example 1 pm to 0.1 pm or better.

(3) The comparison register 12 outputs a synchronization signal each time the motor 2b is driven by predetermined number of pulses. The CPU 14 reads the count value of the counter 8 as correction data each time the synchronization signal is output and calculates the wavelength. It is thus possible to automatically calculate and monitor in sequence the wavelength of the light under measurement in the process of sweeping the wavelength of the light under measurement.

Description of the first embodiment is a preferred example of wavelength measurement apparatus 10 according to the invention and the invention is not limited to this embodiment. For example, a heat insulator is preferably provided that keeps constant the embodiment temperature of the fiber-optic Etalon 3 within ±0.1° C. to ±0.01° C. or better stability. Such a heat insulator can comprise for example a thermistor or a Peltier cooling element. In case the wavelength measurement apparatus 10 is composed in this way, accuracy of the measured value is guaranteed in a better order.

It is demonstrated that the finesse (wavelength interval) of the fiber-optic Etalon 3 varies with the wavelength of light under measurement and the finesse gets narrower as the wavelength becomes longer. This variation in the finesses is on the order of 5/100 pm with respect to a variation in the wavelength of 1 nm and thus sufficiently negligible. In case the wavelength is swept over a wide range, the finesse is preferably calibrated as required based on a theoretical formulae such as the Airy's formulae or a measured value.

In case the wavelength interval of the fiber-optic Etalon cannot be keyed to an accurate value due to disturbance such as a temperature, it is possible to correct the wavelength based on the initial wavelength (WLS) at start of sweep and the final wavelength (WLE) at completion of sweep. Assuming that the accuracies of WLS and WLE at wavelength halt are respectively ±ΔWL, the maximum wavelength sweep interval (ΔWLmax) is represented by the following expression (3):

$$\Delta WLmax = (WLE - WLS) + 2\Delta WL \qquad (3)$$

The minimum wavelength sweep interval (ΔWLmin) is represented by the following expression (4):

$$\Delta WLmin = (WLE - WLS) - 2\Delta WL \qquad (4)$$

Assuming that the number of peaks obtained during sweep of the wavelength is N, the wavelength interval at a single count is ΔWLmax/N or ΔWLmin/N. Thus, the difference between the two is the error (EWL) in the wavelength interval during wavelength sweep. That is, $$EWL = \Delta WLmax/N - \Delta WLmin/N \qquad (5)$$

Assuming that the interval of adjacent peaks is set to 1 [pm], sweeping the light under measurement over 1 [nm] results in the final count value N of the counter being 1000. Thus, assuming that ΔWL=15 [pm], EWL is 0.06 [pm]. ΔWL=0 is allowed by measuring WLS using a wavemeter whose accuracy is guaranteed to be sufficiently high in wavelength sweep as well as checking WLE on the wavemeter at completion of the sweep. Thus the error EWL can be reduced to 0. It is clear that using either WLS or WLE can reduce the error.

The value of the length of the light under measurement in the interval between synchronization signals maybe estimated through interpolation using a known interpolation method such as the least square method. Further, the motor 2b may be in particular composed of a DC servo motor, AC servo motor, or a pulse motor that does not use an encoder. Employing any type of such a motor allows control similar to the aforementioned control. Detailed configuration and operation of the wavelength measurement apparatus 10 can be changed as required without departing from the range of the invention.

Second Embodiment

Figure 4:
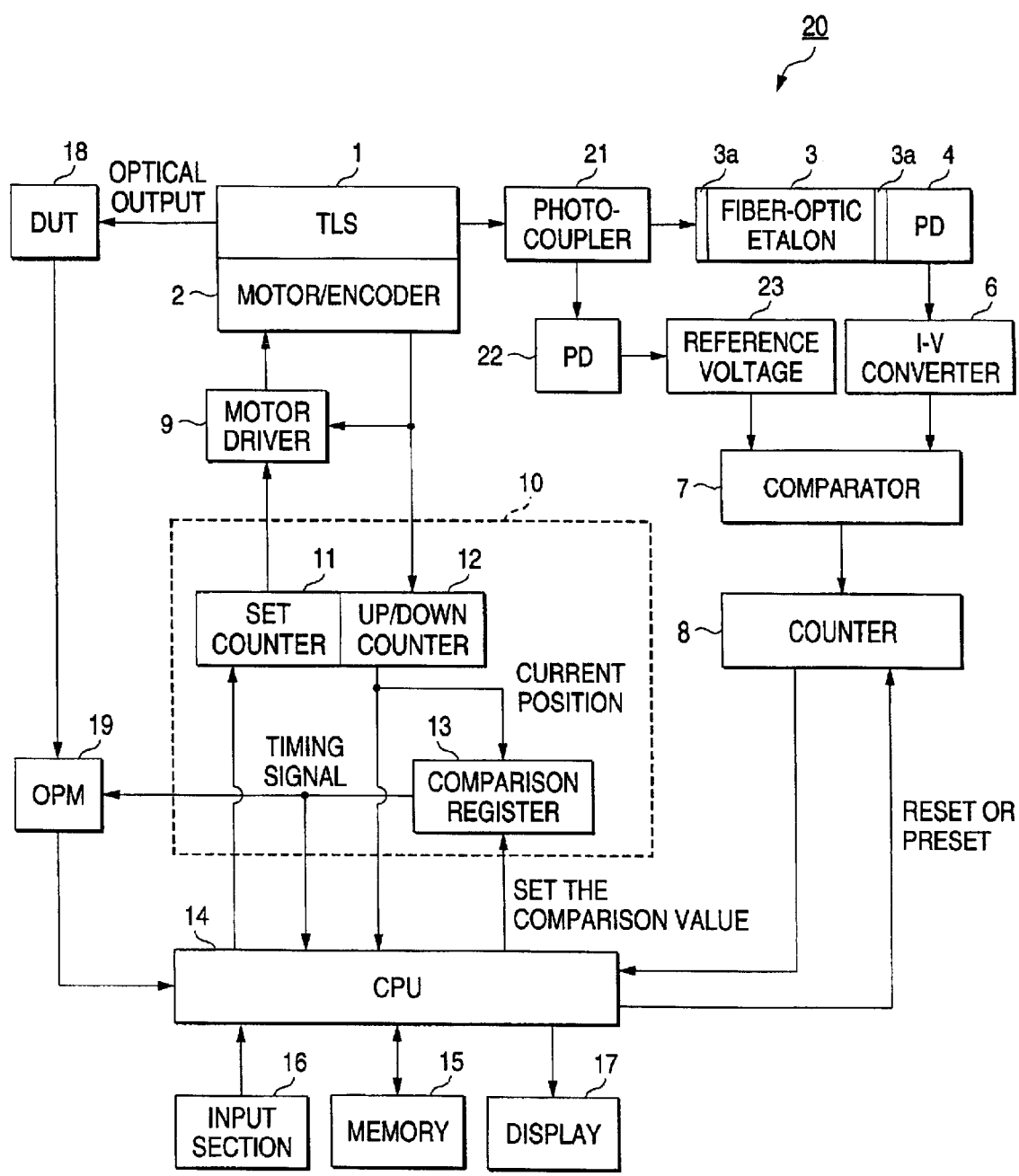
FIG. 4 is a block diagram showing the configuration of wavelength measurement apparatus 20 according to the second embodiment.

FIG. 4 is a block diagram showing the configuration of wavelength measurement apparatus 20 according to the second embodiment of the invention. In FIG. 4, same components as those of the aforementioned wavelength measurement apparatus 10 are given the same signs and corresponding description is omitted. The wavelength measurement apparatus 20 is characterized of comprising a photocoupler 21, a photodiode 22, and a reference voltage source 23.

The photocoupler 21 branches the outgoing light of the tunable light source 1 to light under measurement to be incident on the fiber-optic Etalon 3 and reference light to be incident on the photodiode 22 before the fiber-optic Etalon 3. The photodiode 22 outputs a current corresponding to the reference light branched by the photocoupler 21. The reference voltage source 23 applies the reference voltage (counter threshold voltage) corresponding to the current value output from the photodiode 22 to the subsequent comparator 7.

According to the wavelength measurement apparatus 20, the reference voltage (counter threshold voltage) applied to the comparator 7 varies with the light intensity of the outgoing light of the tunable light source 1. Even in case the intensity of the outgoing light of the tunable light source 1 is subject to fluctuation, it is possible to avoid an error in the count value of the counter 8 caused by the fluctuation. That is, the fluctuation exerts an influence on both the output voltage of I-V converter and the reference voltage (counter threshold voltage) from the reference voltage source so that the fluctuation is canceled when the comparator 7 compares these values with each other.

Third Embodiment

Figure 5:
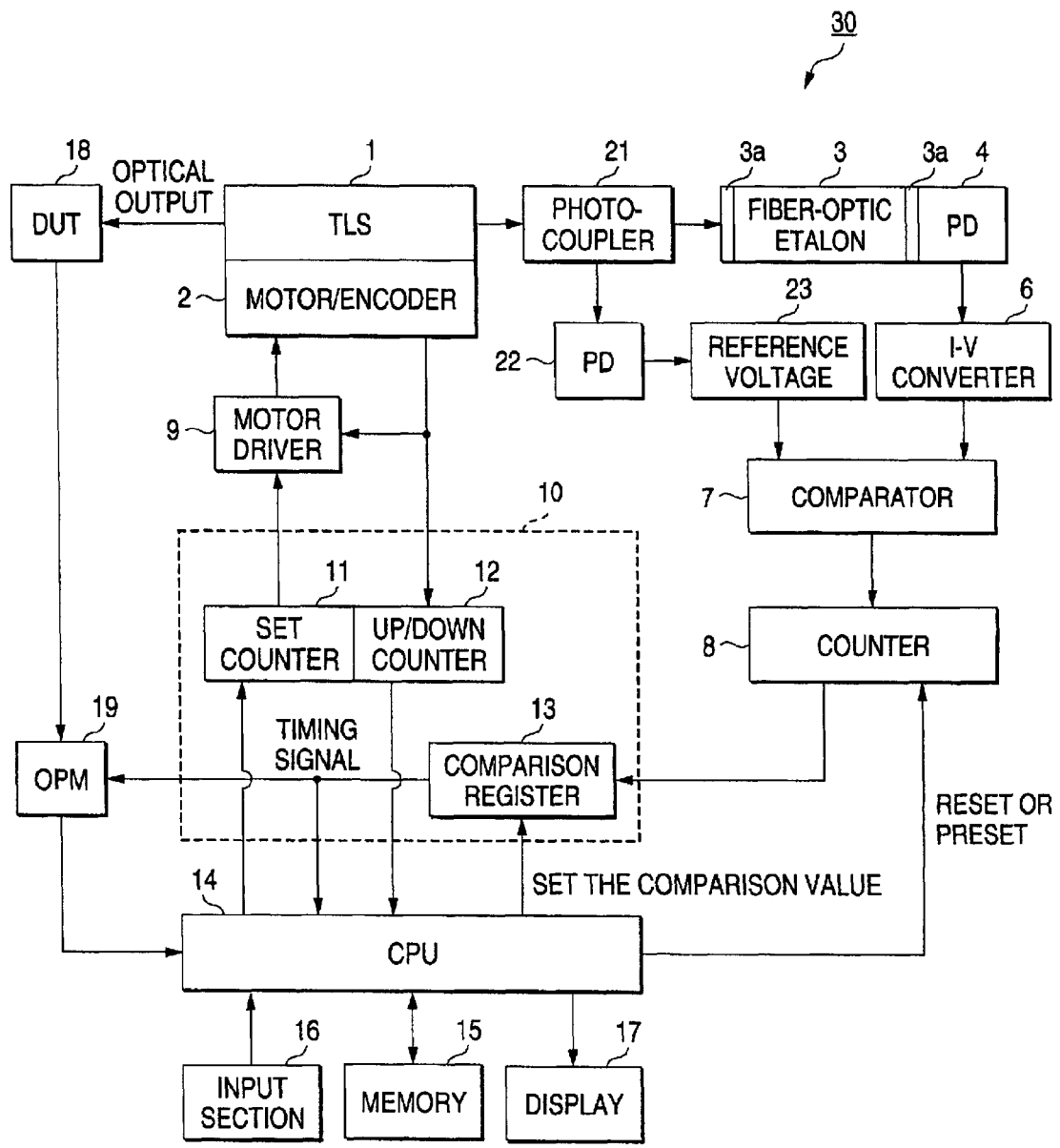
FIG. 5 is a block diagram showing the configuration of wavelength measurement apparatus 30 according to the third embodiment.

FIG. 5 is a block diagram showing the configuration of wavelength measurement apparatus 30 according to the third embodiment of the invention. In FIG. 5, same components as those of the aforementioned wavelength measurement apparatus 20 are given the same signs and corresponding description is omitted. The wavelength measurement apparatus 30 is configured generally the same as the wavelength measurement apparatus 20 according to the second embodiment but is characterized of determining the timing to issue a synchronization signal based on the value of the counter 8.

The memory 15 stores the third table that specifies the variation in the wavelength of light under measurement per unit count value of the up/down counter 12.

Operation of the wavelength measurement apparatus 30 will be described below. The operator sets the sweep start wavelength (WLS) (for example 1499.990 [nm]) in advance at the input section 16. Then the sweep start wavelength (WLS) is stored into the memory 15 by the CPU 14 and the light under measurement calibrated so as to precisely coincide with the sweep start wavelength (WLS) is emitted to the fiber-optic Etalon 3 from the tunable light source 1. The CPU 14, detecting that the light under measurement has been incident on the fiber-optic Etalon 3, resets (or presets) the count values of the counter 8 and the up/down counter 12 and sets each count value to zero.

Then, the operator enters the final wavelength obtained at completion of the sweep process at the input section 16. Detecting the input of the final wavelength, the CPU 14 references the memory 15 to recognize the number of pulses as the final destination of the motor 2b corresponding to the final wavelength, and sets the number of pulses recognized as the final destination to the set counter 11. The CPU 14 further sets the initial value of the comparator value to the comparison register 13.

When the number of pulses is set to the set counter 11, The motor driver 9 starts driving the motor/encoder 2 thus starting the wavelength sweep of the light under measurement. In the process, the encoder 2a outputs a response signal to the motor driver 9 and the up/down counter 12 each time the motor 2b is driven by one step. The up/down counter 12 increments the count value each time it detects a response signal, and outputs the incremented count value to the CPU 14. The CPU 14 recognizes the current position of the motor 2b based on the count value of the up/down counter 12.

In the process the wavelength is swept, the count value of the counter 8 is referenced by the comparison register 13 as required, and in case the count value of the counter 8 has matched the comparison value, a synchronization signal (TIMINGSIGNAL) is output from the comparison register 13 to the CPU 14 and the OPM 19.

The CPU 14, each time it detects a synchronization signal, reads the count value of the up/down counter 12 as correction data and calculates the length of the light under measurement based on the read count value and the third table of the memory 15. The OPM 19, each time it detects a synchronization signal, captures the optical output from the DUT 18 and transfers the captured optical output to the CPU 14.

Then, the CPU 14 instructs the display to monitor in real time the wavelength of the light under measurement calculated and the optical output from the OPM 19 as well as sequentially updates the comparison value of the comparison register 13 to next value. In this way, the local wavelength at that point in time is monitored each time a synchronization signal is issued. FIG. 6 is a schematic representation in time series by synchronization signal of the comparison value of the comparison register 13 (value of the counter 8), count value of the up/down counter 12, wavelength value calculated based on the count value of the up/down counter 12, and the actual wavelength of the light under measurement. In the figure, the peak interval of the transmitted light of the fiber-optic Etalon 3 is calibrated in units of pm/count and the sweep start wavelength (WLS) is known so that the comparison value of the comparison register 12 and the actual wavelength of the light under measurement are in one-to-one correspondence. FIG. 6 assumes that the comparison value of the comparison register is updated in intervals of 10 peaks.

In case the comparison value is not calibrated nor the sweep start wavelength is known, it is preferable that the count value of the up/down counter 12 is referenced when a synchronization signal is issued and the wavelength is corrected in accordance with the expressions (3) through (5).

Fourth Embodiment

Figure 7:
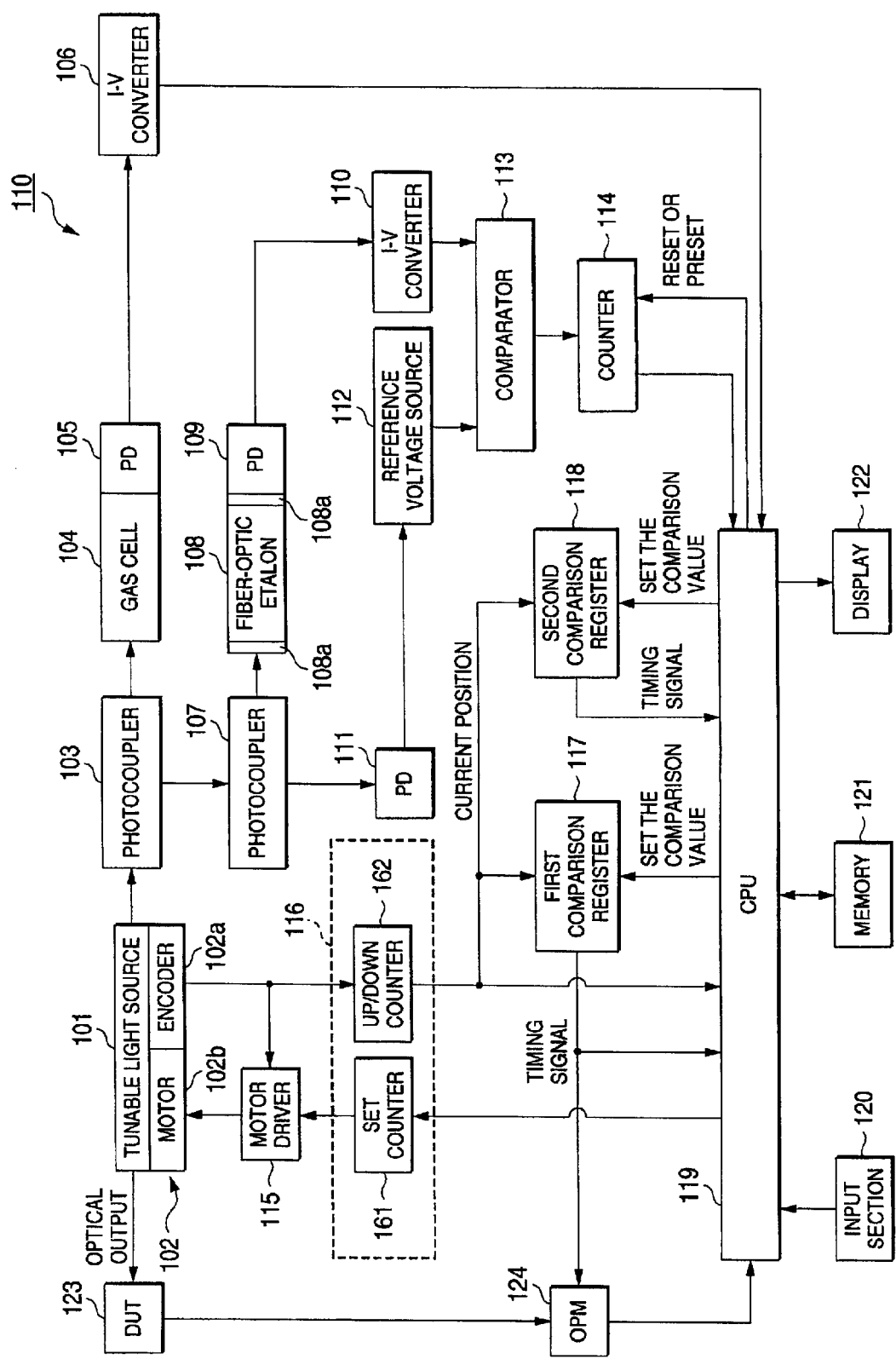
FIG. 7 is a block diagram showing the configuration of a wavelength measurement apparatus 110 according to the fourth embodiment.

FIG. 7 is a block diagram showing a wavelength measurement apparatus according to the fourth embodiment. The wavelength measurement apparatus 110 comprises a tunable light source (TLS) 101, a motor/encoder 102, photocouplers 103, 107, a gas cell 104, photodiodes 105, 109, 111, current-to-voltage converters 106, 110, fiber-optic Etalon 108, a reference voltage source 112, a comparator 113, a counter 114, a motor driver 115, a first comparison register 117, a second comparison register 118, a CPU 119, an input section 120, a memory 121, a display 122, and an OPM 124. A DUT (Device Under Test) 123 is shown as a target of measurement.

While not shown, the tunable light source has a semiconductor laser (LD: Laser Diode) with a non-reflective film supplied on one end, and a tunable structure composed of a diffraction grating and mirrors for adjusting the oscillation of the semiconductor laser. The tunable light source 101 is calibrated in advance so that the oscillation wavelength may coincide with a reference wavelength (for example 1500.000 nm) in case the reference wavelength (1500.000 nm) is set at the input section 120.

The motor/encoder 102 comprises an encoder 102a and a motor 102b. The encoder 102a outputs a pulse signal corresponding to the rotation speed of the rotation shaft in the motor 102b to the motor controller 116. The motor controller 116 calculates the number of pulses of a pulse signal input from the encoder 102a and controls the rotation speed of the rotation shaft in the motor 102b based on the set count value input from the CPU 119. That is, by changing the position of the diffraction grating or mirrors attached to the motor/encoder 102 constituting the tunable structure of the tunable light source 101, oscillation wavelength of the semiconductor laser is continuously varied for sweep process.

The photocoupler 103 branches the light under measurement incident from the tunable light source 101 to a light beam to be incident on the gas cell 104 and a light beam to be incident on the photocoupler.

The gas cell 104 is a glass cell containing 12-acetylene gas or 13-acetylene gas as an isotope thereof or cyanide gas inside the glass cell. The gas cell 104 intensely absorbs the light under measurement only in case the wavelength of branched by the photocoupler 103 and incident has reached the wavelength of the absorption line of the gas (hereinafter referred to as "absorption wavelength").

The photodiode 105 detects the transmitted light of the gas cell 104 and outputs a current corresponding to the intensity (power) of the transmitted light. The current-to-voltage converter 106 converts a current output from the photodiode 105 to a voltage corresponding to the magnitude of the current, and applies the resulting voltage to the CPU 119.

The photocoupler 107 further branches the light under measurement branched by the photocoupler 103 to light incident on the fiber-optic Etalon 108 and light incident on the photodiode 111. The fiber-optic Etalon 108 comprises an optical fiber and a pair of high-reflection films (AR coating) 108a, 108b provided perpendicular to the propagation direction of the optical fiber on both ends of the optical fiber. The fiber-optic Etalon 108 has a free spectral range (FSR) shorter than the interval between any two types of absorption wavelengths of the gas cell 104.

The photodiode 109 detects transmitted light of the fiber-optic Etalon 108 and outputs a current according to the intensity (power) of the transmitted light. The current-to-voltage converter 110 converts a current output from the photodiode 109 to a voltage (hereinafter referred to as the "output voltage") corresponding to the magnitude of the current, and outputs the resulting voltage to the comparator 113.

The photodiode 111 detects light under measurement branched by the photocoupler 107 and outputs a current according to the intensity (power) of the transmitted light. The reference voltage source 112 outputs a reference voltage (counter threshold voltage) corresponding to the current value output from the photodiode 111 to the comparator 113.

Figure 8:
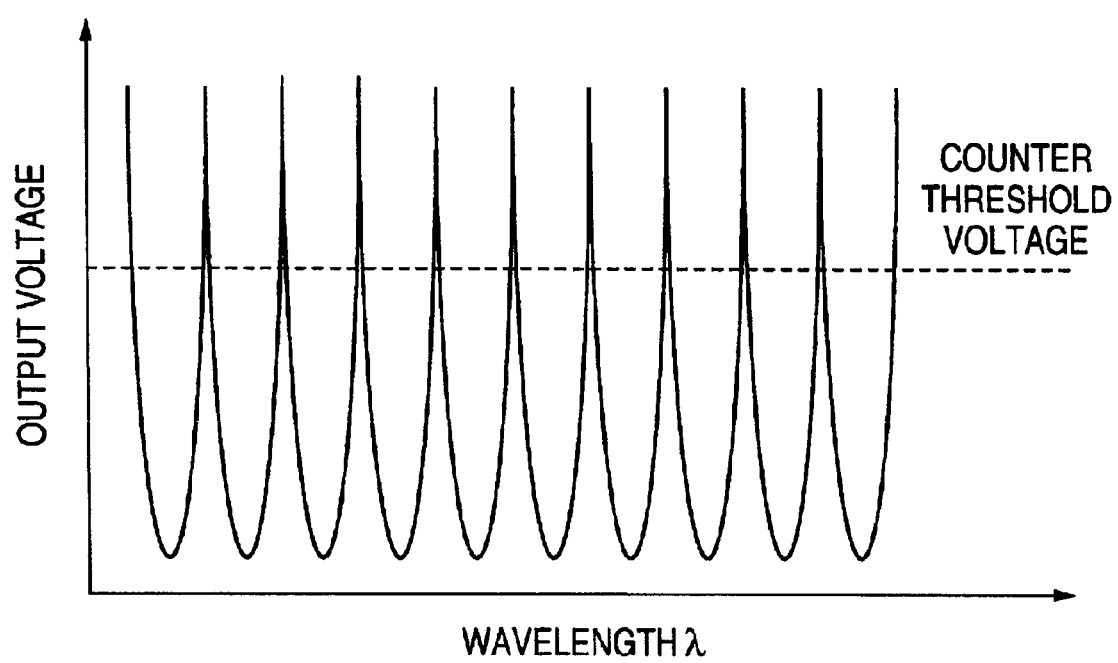
FIG. 8 shows the transmission characteristics of fiber-optic Etalon 108.

The comparator 113 compares the output voltage output from the current-to-voltage converter 110 with the counter threshold voltage output from the reference voltage source and outputs the comparison results to the counter 114. Here, operation of the comparator 113 is specifically described referring to the monitor example of the output voltage in FIG. 8. In FIG. 8, the horizontal axis represents the wavelength of the light under measurement and the vertical axis an output voltage value. The broken line represents a counter threshold voltage. While the counter threshold voltage is constant in FIG. 8, the counter threshold voltage actually varies with the light intensity of the emitted light of the tunable light source 101.

The fiber-optic Etalon 108 selectively transmits only the light under measurement having a specific wavelength. In case the wavelength of the light under measurement incident on the fiber-optic Etalon 108 is continuously swept, a cyclic peak waveform appears on the output voltage as shown in FIG. 8. The wavelength representing the interval between adjacent peak waveforms (FSR) depends on the physical characteristics of the fiber-optic Etalon 108. It is assumed that the FSR of the fiber-optic Etalon 108 is calibrated in units of 1 pm.

The comparator 113 compares the output voltage with the counter threshold voltage and outputs a first state signal as comparison results to the counter 114 in case the output voltage is above the counter threshold voltage value. The comparator 113 outputs a second state signal as comparison results to the counter 114 in case the output voltage is below the counter threshold voltage value.

The counter 114 increments or decrements the count value each time the comparison results input from the comparator 113 make transition from the first state signal to the second state signal, or from the second state signal to the first signal, that is, each time the output voltage exceeds/drops below the counter threshold voltage value.

The motor driver 115 uses the CPU 119 to adjust the application time of the motor drive signal applied to the motor 102b based on the count value set to the set counter 161 in the motor controller 116 thereby controlling the rotation speed of the rotation shaft in the motor 102b.

The motor controller 116 comprises a set counter 161 and an up/down counter 162. The set counter 161 is a counter where the count value corresponding to the rotation speed of the rotation shaft in the motor 102b is set by the CPU 119. The up/down counter 162 increments/decrements the number of pulses of a pulse signal input from the encoder 102a in the process of sweeping light under measurement and outputs the count value obtained to the CPU 119, the first comparison register 117, and the second comparison register 118. The count value of the up/down counter 162 represents the rotation speed of the rotation shaft in the motor 102b.

The first comparison register 117 stores the comparison value updated and input as required by the CPU 119 as well as compares the comparison value with the count value input from the up/down counter 162. In case the comparison results match with each other, the first comparison register 117 outputs a synchronization signal (TIMINGSIGNAL) to the CPU 119 and the OPM 124.

The second comparison register 118 stores the comparison value updated and input as required by the CPU 119 as well as compares the comparison value with the count value input from the up/down counter 162. In case the comparison results match with each other, the first comparison register 117 outputs a synchronization signal (TIMINGSIGNAL) to the CPU 119.

The CPU 119 acquires the count value of the counter 114 each time it detects a synchronization signal input from the first comparison register 117 as well as acquires the voltage value input as a signal for correcting the wavelength value from the current-to-voltage converter 106 each time it detects a synchronization signal input from the second comparison register 118. The CPU 119 calculates the wavelength of the light under measurement based on these values.

The input section 120 is equipped with various keys for the operator to input a desired reference wavelength. The memory 121 comprises an EEPROM (Electrically Erasable, Programmable Read Only Memory) and flash ROM and stores the first table that specifies the relationship between the number of pulses and wavelength of the motor 102b and the second table that specifies the wavelength absorption position of a pre-calibrated gas cell. The display 122 displays the wavelength of the light under measurement calculated by the CPU 119.

The DUT 123 is a target of measurement by an optical module, optical splitter and optical circulator. On the DUT 123 are incident laser beams from the tunable light source 101. The OPM 124 detects the transmitted light of the DUT 123 and outputs a signal corresponding to the intensity of the detected transmitted light to the CPU 119.

Operation of the wavelength measurement apparatus 110 in FIG. 7 will be described below.

The operator sets the reference wavelength (for example 1500.000 [nm]) in advance at the input section 120. The CPU 119 sets the count value corresponding to the input reference waveform to the set counter 161. The motor driver 115, based on the count value set to the set counter 161, adjusts the application time of the motor drive signal to be applied to the motor 102b and controls the rotation speed of the motor 102b so that the tuning mechanism in the tunable light source may radiate light with the reference wavelength.

Next, the CPU 119 stores the reference wavelength (1500.000 [nm]) input from the input section 120 into the memory 121 as well as resets the count values of the counter 114 and the up/down counter 162 and sets each count value to zero.

Then, the operator enters the final wavelength obtained at completion of the sweep process at the input section 120. The CPU 119 references the first table in the memory 121 to recognize the number of pulses (count value) as the final destination of the motor 102b corresponding to the final wavelength, and sets the count value recognized to the set counter 161. The motor driver 115, based on the count value set to the set counter 161 by the CPU 119, adjusts the application time of the motor drive signal to be applied to the motor 102b and controls the rotation speed of the rotation shaft in the motor 102b.

The up/down counter 162 increments the count value each time it detects a pulse signal input from the encoder 2, and outputs the incremented count value to the first comparison register 13, the second comparison register 118 and the CPU 119. The first comparison register 117 outputs a synchronization signal to the CPU 119 and the OPM 124 each time the comparison value stored by the CPU 119 coincides with the count value of the up/down counter 162.

The CPU 119 reads the count value of the counter 114 each time it detects a synchronization signal input from the first comparison register 117. The CPU 119 then calculates the sum of the relative variation of the wavelength obtained by multiplying the read count value by the peak interval wavelength (initial value is for example 1 [pm]) and the reference wavelength (1500.00 [nm]) stored in the memory 15 in advance. By doing so, the CPU 119 obtains the current wavelength value of the light under measurement.

The wavelength value of the light under measurement is corrected based on the absorption wavelength position of the gas cell 104. The CPU 119 acquires the voltage value input as a signal for correcting the wavelength value from the current-to-voltage converter 106 each time it detects a synchronization signal input from the second comparison register 118.

In case the CPU 119 has read wavelength absorption positions on at least two points, the CPU 119 divides the interval between the wavelength absorption positions (wavelength scale) by the count value counted by the counter 114 to correct the peak interval wavelength value (FSR) of the fiber-optic Etalon 108.

Each time a synchronization signal is input from the first comparison register or second comparison register, the CPU 119 updates the comparison value set to each of the registers as required. The OPM 124 outputs to the CPU 119 a signal corresponding to the light output intensity of the transmitted light received from the DUT 123 each time it detects a synchronization signal input from the first comparison register 117. Then the CPU 119 uses the peak interval wavelength (FSR) of the fiber-optic Etalon 108 corrected to correct the wavelength of a synchronization signal generated by the first comparison register, thus making the display 122 to display the wavelength of the corrected light under measurement and optical output corresponding to the intensity of the transmitted light of the DUT 123 input from the OPM 124.

According to the wavelength measurement apparatus 110 of the embodiment, the following advantages are obtained:

(1) It is possible to determine the wavelength of light under measurement based on a plurality of wavelength absorption positions of the pre-calibrated gas cell 104. Accordingly, the CPU 119 can calculate the wavelength value of the light under measurement with high accuracy.

(2) The CPU 119 divides the interval between two types of wavelength absorption positions by the count value counted by the counter 114 while the wavelength of the light under measurement makes transition from one of the two types of wavelengths to the other thereby correcting the FSR of the fiber-optic Etalon 108. This assures high-accuracy measurement of the wavelength of the light under measurement. In case the wavelength of the light under measurement varies between absorption wavelengths at two points of the gas cell 104 and FSR of the fiber-optic Etalon 108 is once corrected, the wavelengths outside the two types of wavelengths can be corrected in real time by retaining the corrected value.

(3) The count value (number of peaks) currently counted by the counter 114 represents a relative variation in the wavelength from the start of sweep to this point in time. The CPU 119 calculates in real time the wavelength of the light under measurement based on the count value by using the synchronization signal as a trigger, so that the CPU 119 can monitor the instantaneous wavelength value of the light under measurement at this point in time. As a result, it is possible to measure the wavelength of the light under measurement under sweep process with high accuracy even in case the wavelength is continuously swept.

(4) The shorter the FSR interval, the better the resolution of wavelength variation during sweep. For the fiber-optic Etalon 108, it is possible to provide the sufficient length so that it is easy to measure the wavelength of continuously swept light under measurement with accuracies of for example 1 [pm] or better.

(5) The reference voltage (counter threshold voltage) applied to the comparator 113 varies with the light intensity of the outgoing light of the tunable light source 101. Even in case the intensity of the outgoing light of the tunable light source 101 is subject to fluctuation, it is possible to avoid an error in the count value of the counter 114 caused by the fluctuation. That is, the fluctuation exerts an influence on both the output voltage of current-to-voltage converter and the reference voltage (counter threshold voltage) from the reference voltage source so that the fluctuation is canceled when the comparator 113 compares these values with each other.

Description of the fourth embodiment is a preferred example of wavelength measurement apparatus 110 according to the invention and the invention is not limited to this embodiment. For example, the gas cell 104 is employed to mark wavelength values on at least two points within the wavelength variation range, Fabry-Perot Etalon, an interference optical filter, or a band-pass filter with the cycle of the free spectral range (FSR) pre-calibrated accurately may be employed instead of the gas cell 104.

A heat insulator is preferably provided that keeps constant the embodiment temperature of the fiber-optic Etalon within ±0.1° C. to ±0.01° C. or better stability. Such a heat insulator can be composed of for example a thermistor or a Peltier cooling element. In case the wavelength measurement apparatus is composed in this way, expansion/contraction of the length L of the fiber-optic Etalon and a change in the refraction index n can be prevented so that accuracy of the measured value is guaranteed in a better order.

In case the wavelength interval of the fiber-optic Etalon cannot be keyed to an accurate value due to disturbance such as a temperature, it is possible to correct the wavelength based on the initial wavelength (WLS) at start of sweep and the final wavelength (WLE) at completion of sweep. Assuming that the accuracies of WLS and WLE at wavelength halt are respectively $\pm\Delta WL$, the maximum wavelength sweep interval ($\Delta WLmax$) is represented by the following expression (3):

$$\Delta WLmax = (WLE - WLS) + 2\Delta WL \quad (3)$$

The minimum wavelength sweep interval ($\Delta WLmin$) is represented by the following expression (4):

$$\Delta WLmin = (WLE - WLS) - 2\Delta WL \quad (4)$$

Assuming that the number of peaks obtained during sweep of the wavelength is N, the wavelength interval at a single count is $\Delta WLmax/N$ or $\Delta WLmin/N$. Thus, the difference between the two is the error (EWL) in the wavelength interval during wavelength sweep. That is, $$EWL = \Delta WLmax/N - \Delta WLmin/N \quad (5)$$

Assuming that the interval of adjacent peaks is set to 1 [pm], sweeping the light under measurement over 1 [nm] results in the final count value N of the counter being 1000. Thus, assuming that $\Delta WL = 15$ [pm], EWL is 0.06 [pm]. $\Delta WL = 0$ is allowed by measuring WLS using a wavemeter whose accuracy is guaranteed to be sufficiently high in wavelength sweep as well as checking WLE on the wavemeter at completion of the sweep. Thus the error EWL can be reduced to 0. It is clear that using either WLS or WLE can reduce the error.

It is demonstrated that the FSR of the fiber-optic Etalon 108 varies with the wavelength of light under measurement and the finesse gets narrower as the wavelength becomes longer. This variation in the finesses is on the order of 5/100 pm with respect to a variation in the wavelength of 1 nm and thus sufficiently negligible. In case the wavelength is swept over a wide range, the finesse is preferably calibrated as required based on a theoretical formulae such as the Airy's formulae or a measured value.

The value of the length of the light under measurement in the interval between synchronization signals maybe estimated through interpolation using a known interpolation method such as the least square method. Further, the motor 102b may be in particular composed of a DC servo motor, AC servo motor, or a pulse motor. Employing any type of such a motor allows control similar to the aforementioned control. Detailed configuration and operation of the wavelength measurement apparatus 110 can be changed as required without departing from the range of the invention.

Fifth Embodiment

Figure 9:
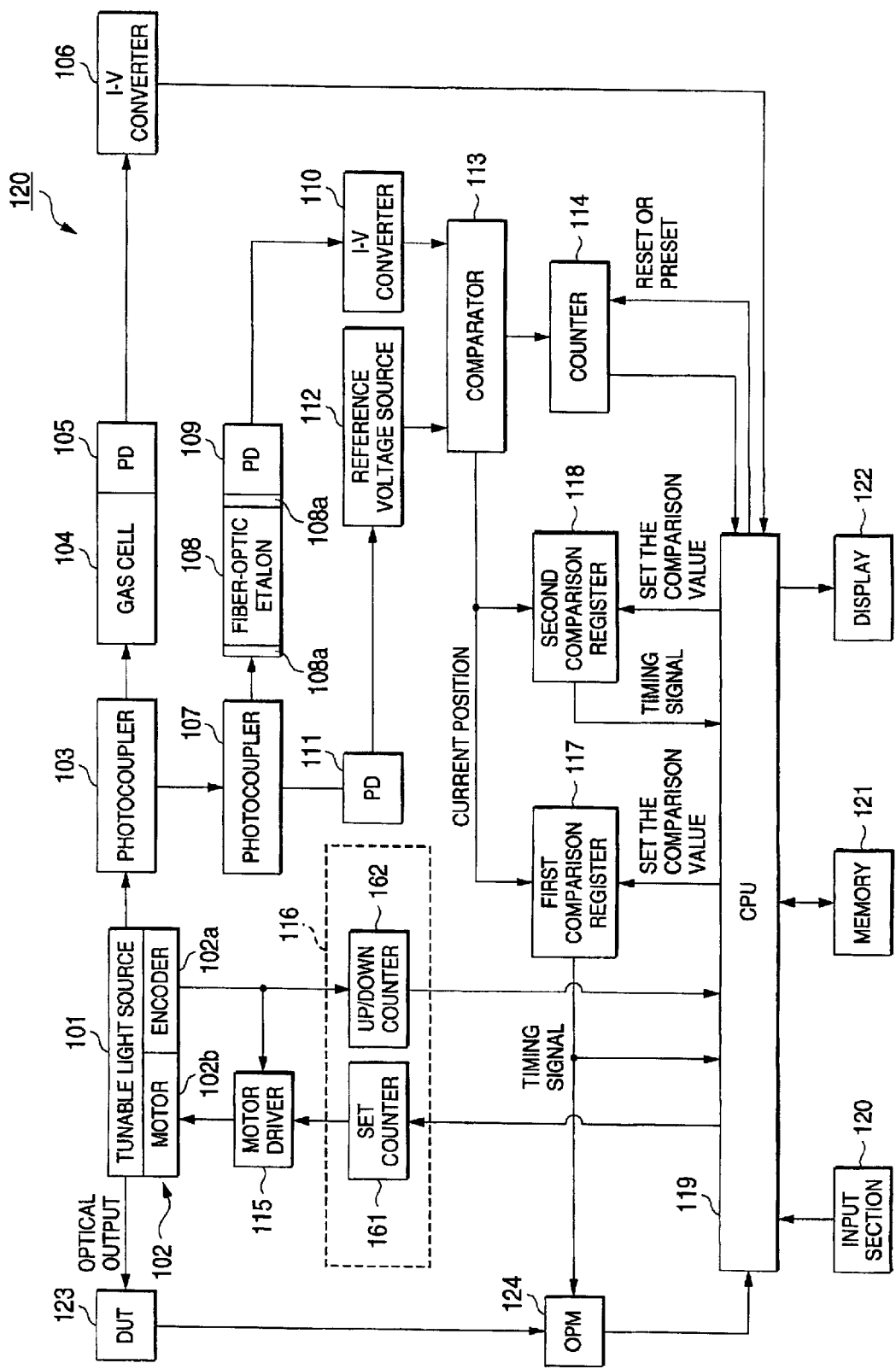
FIG. 9 is a block diagram showing the configuration of a wavelength measurement apparatus 20 according to the fifth embodiment.

FIG. 9 is a block diagram showing the configuration of wavelength measurement apparatus 120 according to the fifth embodiment of the invention. In FIG. 9, same components as those of the aforementioned wavelength measurement apparatus 110 are given the same signs and corresponding description is omitted. The wavelength measurement apparatus 120 is configured generally the same as the wavelength measurement apparatus 110 according to the fourth embodiment but is characterized of determining the timing to issue the synchronization signals of the first comparison register 117 and the second comparison register 118 based on the count value of the counter 114.

In the wavelength measurement apparatus 120, the memory 121 stores the third table that specifies the variation in the wavelength of light under measurement per unit count value of the up/down counter 162.

Operation of the wavelength measurement apparatus 120 will be described below.

The operator sets the reference wavelength (for example 1500.000 [nm]) in advance at the input section 120. The CPU 119 sets the count value corresponding to the input reference waveform to the set counter 161. The motor driver 115, based on the count value set to the set counter 161, adjusts the application time of the motor drive signal to be applied to the motor 102b and controls the rotation speed of the motor 102b so that the tuning mechanism in the tunable light source may radiate light with the reference wavelength. The reference light calibrated to coincide with the preset reference wavelength is emitted accurately from the tunable light source 101 to the gas cell 104 and the fiber-optic Etalon 108.

Next, the CPU 119 stores the reference wavelength (1500.000 [nm]) input from the input section 120 into the memory 121 as well as resets the count values of the counter 114 and the up/down counter 162 and sets each count value to zero.

Then, the operator enters the final wavelength obtained at completion of the sweep process at the input section 120. The CPU 119 references the first table in the memory 121 to recognize the number of pulses (count value) as the final destination of the motor 102b corresponding to the final wavelength, and sets the count value recognized to the set counter 161. The motor driver 115, based on the count value set to the set counter 161 by the CPU 119, adjusts the application time of the motor drive signal to be applied to the motor 102b and controls the travel amount of the driver in the motor 102b.

The up/down counter 162 increments the count value each time it detects a pulse signal input from the encoder 102, and outputs the incremented count value to the first comparison register 117, the second comparison register 118 and the CPU 119. The first comparison register 117 outputs a synchronization signal to the CPU 119 and the OPM 124 each time the comparison value stored by the CPU 119 coincides with the count value of the up/down counter 162.

The CPU 119 reads the count value of the counter 114 each time it detects a synchronization signal input from the first comparison register 117. The CPU 119 multiplies the read count value by the wavelength variation per unit count value specified in the third table to calculate the variation in the wavelength value of the light under measurement. The CPU 119 then uses the sum of the variation and the reference wavelength at the start of sweep to calculate the current wavelength value of the light under measurement.

The wavelength value of the light under measurement is corrected based on the absorption wavelength position of the gas cell 104. The CPU 119 acquires the voltage value input as a signal for correcting the wavelength value from the current-to-voltage converter 106 each time it detects a synchronization signal input from the second comparison register 118.

In case the CPU 119 has read wavelength absorption positions on at least two points, the CPU 119 divides the interval between the wavelength absorption positions by the count value counted by the counter 114 to correct the peak interval wavelength value (FSR) of the fiber-optic Etalon 108.

Each time a synchronization signal is input from the first comparison register or second comparison register, the CPU 119 updates the comparison value set to each of the registers as required. The OPM 124 outputs to the CPU 119 a signal corresponding to the light output intensity of the transmitted light received from the DUT 123 each time it detects a synchronization signal input from the first comparison register 117. Then the CPU 119 instructs the display 122 to display the wavelength of the light under measurement calculated and the optical output corresponding to the transmitted light intensity of the DUT 123 input from the OPM 124. The wavelength measurement apparatus 120 provides the same advantage as the aforementioned wavelength measurement apparatus 110.

Sixth Embodiment

Figure 10:
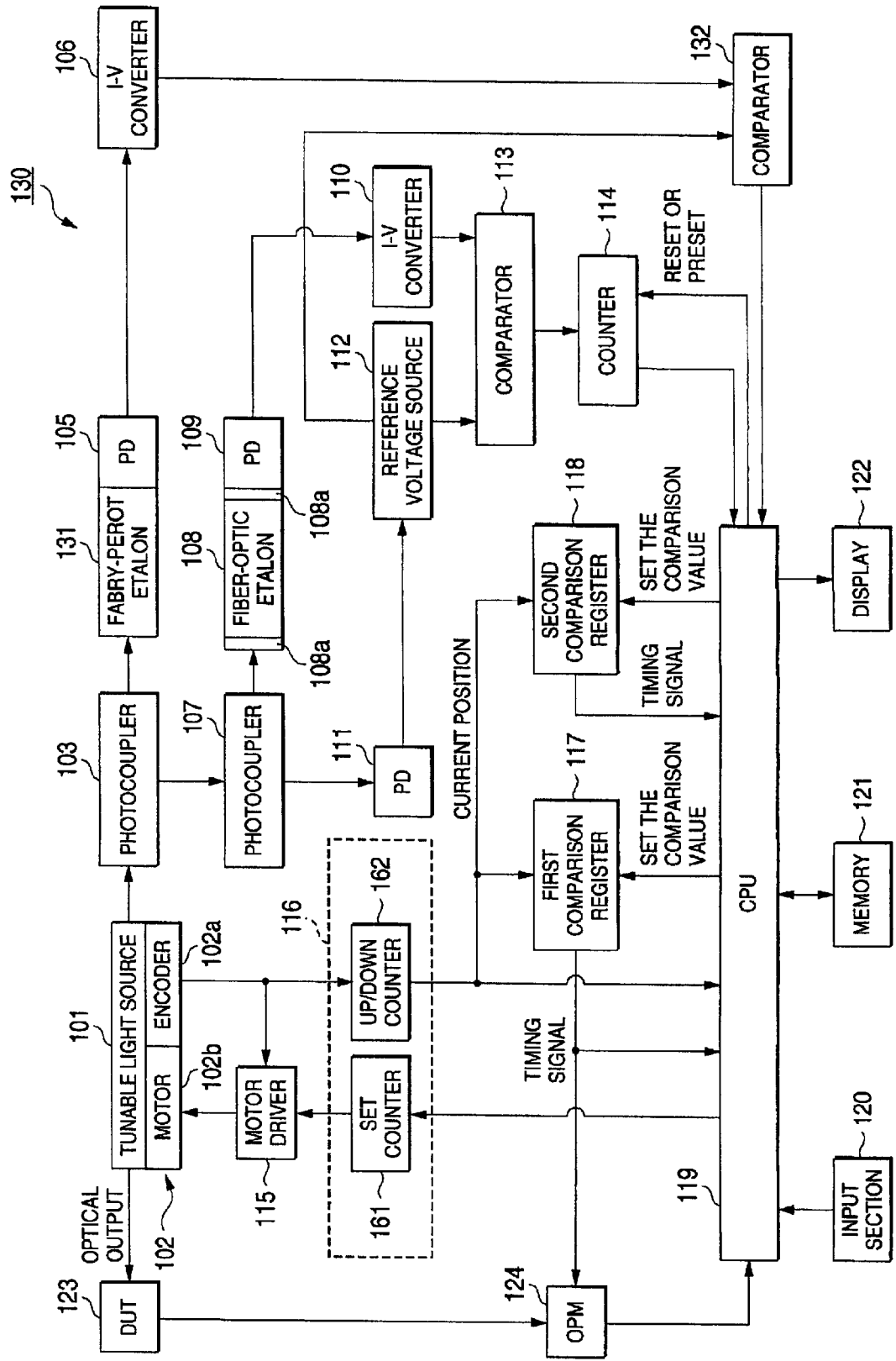
FIG. 10 is a block diagram showing the configuration of a wavelength measurement apparatus 30 according to the sixth embodiment.
Figure 11:
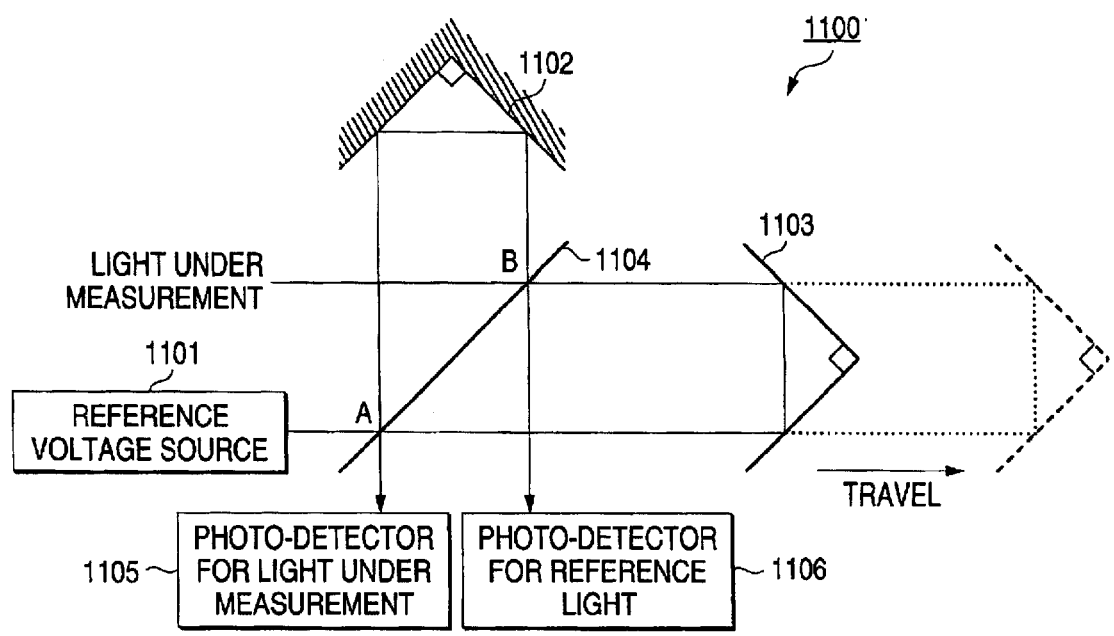
FIG. 11 shows a known Michelson interferometer.
Figure 12:
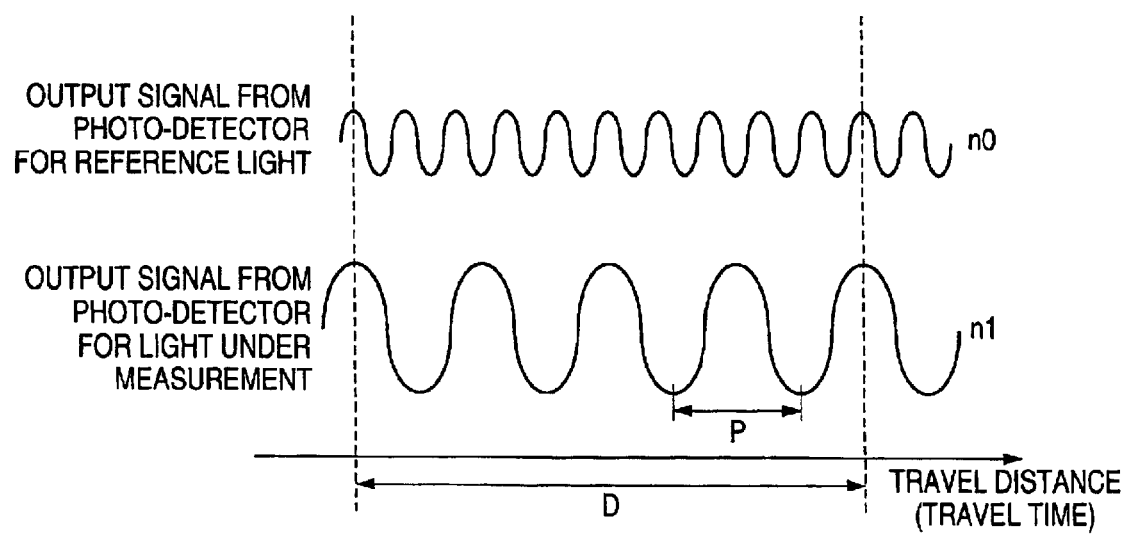
FIG. 12 is a schematic view for explaining the principle of the known Michelson interferometer.

FIG. 10 is a block diagram showing the configuration of wavelength measurement apparatus 130 according to the sixth embodiment of the invention. In FIG. 10, same components as those of the aforementioned wavelength measurement apparatus 110 are given the same signs and corresponding description is omitted. The wavelength measurement apparatus 130 is configured generally the same as the wavelength measurement apparatus 110 according to the fourth embodiment but is characterized of employing Fabry-Perot Etalon 131 instead of the gas cell 104 and comprising a comparator 132.

It is assumed that the Fabry-Perot Etalon 131 has been pre-calibrated so that the free spectral range (FSR) may accurately coincide with 1 [nm]. The comparator 132 compares the counter threshold voltage from the reference voltage source 112 with the output voltage from the current-to-voltage converter 106 and outputs the comparison results to the CPU 119.

In the wavelength measurement apparatus 130, the wavelength of the light under measurement is corrected as required based on the free spectral range (FSR) of the Fabry-Perot Etalon 131. That is, the CPU 119 acquires the comparison results as a signal for correcting the wavelength value from the comparator 132 each time it detects a synchronization signal from the second comparison register 118. The CPU 119 then recognizes the interval of the free spectral range (FSR) of the Fabry-Perot Etalon 131 based on the comparison results.

The CPU 119, detecting that the transmitted output of the Fabry-Perot Etalon 131 has reached its peak based on the comparison results from the comparator 132, corrects and determines the relative travel amount of the light under measurement based on multiples of the free spectral range (FSR) of the Fabry-Perot Etalon 131. The CPU 119 divides the interval of the free spectral range (FSR) of the Fabry-Perot Etalon by the count value counted by the counter 114 while the wavelength of the light under measurement varies in the interval, to correct the FSR of the fiber-optic Etalon 108. The wavelength measurement apparatus 130 provides the same advantage as the aforementioned wavelength measurement apparatus 110.

A counter for counting the number of peaks of the transmitted output of the Fabry-Perot Etalon 131 and a comparison register for outputting a synchronization signal each time the counter value reaches a predetermined value may be provided after the comparator 132.

According to the first or second aspect of the invention, it is possible to measure the wavelength of light under measurement under sweep process with high accuracy and in real time even in case the wavelength is continuously swept.

According to the third, fourth, or fifth aspect of the invention, it is possible to calculate in real time the wavelength of light under measurement per predetermined timing in the process of sweeping the light under measurement. It is also possible to calculate, correct and display the wavelength based on the count values after capturing the count values.

According to the sixth aspect of the invention, it is made easy to accurately calculate the number of peaks of the output of the photo-detector.

According to the seventh aspect of the invention, even in case a fluctuation is present in the intensity of the light under measurement, it is possible to avoid an error in the count value caused by the fluctuation. That is, the fluctuation exerts an influence on both the output of the photo-detector and the reference value so that it is possible to cancel the fluctuation in case these values are compared with each other.

According to the eighth aspect of the invention, in case an error is present in the calculation results of the controller, the error can be reduced. In particular, in case the wavelength value of the light under measurement is corrected based on both the sweep start wavelength value and the sweep end wavelength value, the accuracy of wavelength halt of the light under measurement (±ΔWL) at the start and end of sweep can be set to zero. As a result, an error in the peak interval can be set to zero. This obtains a more accurate wavelength value.

According to the ninth aspect of the invention, it is possible to measure the wavelength of continuously swept light under measurement with accuracies of for example 1 pm to 0.1 pm or better.

According to the tenth aspect of the invention, it is possible to prevent expansion/contraction of the length L of the fiber-optic Etalon caused by variation in the ambient temperature. This assures more accurate measurement of the wavelength of light under measurement.

According to an eleventh through fifteenth aspects of the invention, it is possible to measure the wavelength of the light under measurement under sweep process with high accuracy even in case the wavelength is continuously swept.

According to the sixteenth through eighteenth aspects of the invention, it is possible to capture the wavelength of the light under measurement per predetermined timing in the process of sweeping the light under measurement. It is also possible to calculate, correct and display the wavelength based on the count values after capturing the count values.

According to the nineteenth aspect of the invention, it is made easy to accurately calculate the number of peaks of the output of the photo-detector.

According to the twentieth aspect of the invention, even in case a fluctuation is present in the intensity of the light under measurement, it is possible to avoid an error in the count value caused by the fluctuation.

According to the twenty-first aspect of the invention, it is possible to measure the wavelength of light under measurement more accurately. In particular, in case the wavelength value of the light under measurement is corrected based on both the sweep start wavelength value and the sweep end wavelength value, the accuracy of wavelength halt of the light under measurement (±ΔWL) at the start and end of sweep can be set to zero. As a result, an error in the peak interval can be set to zero. This obtains a more accurate wavelength value.

According to the twenty-second aspect of the invention, it is possible to measure the wavelength of continuously swept light under measurement with accuracies of for example 1 [pm] or better.

According to the twenty-third aspect of the invention, it is possible to prevent expansion/contraction of the length L and a change in the refraction index n of the fiber-optic Etalon caused by variation in the ambient temperature. This assures more accurate measurement of the wavelength of light under measurement.

What is claimed is:

1. A wavelength measurement apparatus comprising:
   an optical filter to which a light beam is incident;
   a photo-detector for detecting the transmitted light of the optical filter, the photo-detector for outputting intensity of the transmitted light;
   a counter for counting the number of peaks of the output of the photo-detector to generate a count value; and
   a controller for calculating the wavelength of the light beam based on the count value of the counter, wherein the controller is adapted to correct the wavelength value of the light beam calculated by the controller based on at least one of the sweep start wavelength value and the sweep end wavelength value of the light beam.

2. The wavelength measurement apparatus according to claim 1, wherein the controller resets the count value when light having a known reference wavelength is incident.

3. The wavelength measurement apparatus according to claim 1, further comprising:
   a synchronization signal output unit for outputting a synchronization signal with a predetermined timing,
   wherein the controller acquires the count value each time the synchronization signal from the synchronization signal output unit is detected.

4. The wavelength measurement apparatus according to claim 3, wherein the synchronization signal output unit outputs the synchronization signal based on the count value of the counter.

5. The wavelength measurement apparatus according to claim 3, wherein the light beam is emitted from a tunable light source comprising a light source and a wavelength adjusting mechanism for varying the wavelength of the light source; and
   the synchronization signal output unit outputs the synchronization signal based on the operation amount of the wavelength adjusting mechanism.

6. The wavelength measurement apparatus according to claim 1, wherein the counter counts the number of the peaks of the output by incrementing or decrementing the count value each time the output of the photo-detector exceeds or drops below a predetermined reference value.

7. The wavelength measurement apparatus according to claim 6, wherein the reference value varies according to the light intensity of the reference light beam branched from the light beam before being incident to the optical filter.

8. The wavelength measurement apparatus according to claim 1, wherein the optical filter is a fiber-optic Etalon comprising:
   an optical fiber; and
   two high-reflection members supplied on both ends of the optical fiber.

9. The wavelength measurement apparatus according to claim 8, further comprising:
   a heat insulator for keeping temperature of the fiber-optic Etalon to be constant.

10. The wavelength measurement apparatus, comprising:
    a first optical filter to which one of light beams branched is incident and through which the one of light beams is transmitted, the first optical filter for discriminating the one of the light beam with at least two of pre-calibrated wavelength components;
    a second optical filter to which the other of the branched light beam is incident and the incident light beam is transmitted in a free spectral range shorter than the interval between the two of the pre-calibrated wavelength components; and
    a controller for calculating the wavelength of the light beam based on the transmitted light of the first optical filter and the transmitted light of the second optical filter, wherein the controller is adapted to correct the wavelength value of the light beam based on at least one of the sweep start wavelength value and the sweep end wavelength value of the light beam.

11. The wavelength measurement apparatus according to claim 10, wherein the controller corrects the free spectral area of the second optical filter by dividing the scale of the wavelength between the two of the wavelengths by the number of peaks of the transmitted output of the second optical filter.

12. The wavelength measurement apparatus according to claim 10, wherein the first optical filter is a gas cell for absorbing at least two of pre-calibrated wavelength components.

13. The wavelength measurement apparatus according to claim 10, wherein the first optical filter is an Etalon having a free spectral range between the two of pre-calibrated wavelengths.

14. The wavelength measurement apparatus according to claim 10, further comprising:
    a counter for counting the number of peaks of the transmitted output of the second optical filter,
    wherein the controller resets the count value of the counter when light having a known reference wavelength is incident.

15. The wavelength measurement apparatus according to claim 14, further comprising:
    a synchronization signal output unit for outputting a synchronization signal with a predetermined timing,
    wherein the controller acquires the count value each time the synchronization signal from the synchronization signal output unit is detected.

16. The wavelength measurement apparatus according to claim 15, wherein the synchronization signal output unit outputs a synchronization signal based on the count value of the counter.

17. The wavelength measurement apparatus according to claim 15, wherein the light beam is emitted from a tunable light source comprising a light source and a wavelength adjusting mechanism for varying the wavelength of the light source; and
    the synchronization signal output unit outputs a synchronization signal based on the operation amount of the wavelength adjusting mechanism.

18. The wavelength measurement apparatus according to claim 14, wherein the counter counts the number of peaks of the transmitted output by incrementing or decrementing the count value each time the transmitted output of the second optical filter exceeds or drops below a predetermined reference value.

19. The wavelength measurement apparatus according to claim 18, wherein the reference value varies according to the light intensity of a reference light beam branched from the light under measurement before being incident to the second optical filter.

20. The wavelength measurement apparatus according to claim 10, wherein the second optical filter is a fiber-optic Etalon comprising:
   an optical fiber; and
   two high-reflection members supplied on both ends of the optical fiber.

21. The wavelength measurement apparatus according to claim 20, further comprising:
   a heat insulator for keeping the temperature of the fiber-optic Etalon to be constant.

* * * * *